United States Patent
Henry et al.

(10) Patent No.: US 9,143,270 B2
(45) Date of Patent: Sep. 22, 2015

(54) DIGITAL RECEIVER AND CORRESPONDING DIGITAL TRANSMISSION SYSTEM SERVER

(75) Inventors: Jean-Baptiste Henry, Melesse (FR); Eric Gautier, Cesson Sevigne Cedex (FR)

(73) Assignee: THOMSON LICENSING, Issy les Moulineaux (FR)

( * ) Notice: Subject to any disclaimer, the term of this patent is extended or adjusted under 35 U.S.C. 154(b) by 430 days.

(21) Appl. No.: 13/500,630

(22) PCT Filed: Oct. 7, 2010

(86) PCT No.: PCT/EP2010/065043
§ 371 (c)(1),
(2), (4) Date: Jun. 20, 2012

(87) PCT Pub. No.: WO2011/042514
PCT Pub. Date: Apr. 14, 2011

(65) Prior Publication Data
US 2012/0257492 A1    Oct. 11, 2012

(30) Foreign Application Priority Data

Oct. 9, 2009    (EP) .................................... 09305963

(51) Int. Cl.
*H04L 1/00* (2006.01)
*H04L 1/18* (2006.01)

(52) U.S. Cl.
CPC *H04L 1/004* (2013.01); *H04L 1/18* (2013.01); *H04L 2001/0092* (2013.01); *H04L 2001/0093* (2013.01)

(58) Field of Classification Search
None
See application file for complete search history.

(56) References Cited

U.S. PATENT DOCUMENTS

| 5,392,066 | A | 2/1995 | Fisher et al. |
| 6,031,818 | A * | 2/2000 | Lo et al. ........................ 370/216 |
| 6,199,205 | B1 * | 3/2001 | Chopping ....................... 725/30 |
| 7,194,009 | B2 | 3/2007 | Eng |
| 7,292,583 | B2 | 11/2007 | Schoenblum |
| 7,342,924 | B2 | 3/2008 | Levi et al. |

(Continued)

FOREIGN PATENT DOCUMENTS

| CA | 2345314 | 12/2001 |
| CN | 101345605 | 1/1999 |

(Continued)

OTHER PUBLICATIONS

Peng et al: "A Unified Architecutre and Key Techniques for Interworking between WiMAX and Beyond 3G/4G Systems", Wireless World, vol. 45, No. 1, Oct. 2, 2007, pp. 67-90.

(Continued)

*Primary Examiner* — Chirag Shah
*Assistant Examiner* — Rina Pancholi
(74) *Attorney, Agent, or Firm* — Tutunjian & Bitetto, P.C.

(57) ABSTRACT

The present invention concerns a receiver and an error correction method at a receiver, comprising the steps of receiving data information from a broadcast network in a sequence of packets, detecting a first packet within the sequence of packets being a corrupted packet, identifying a packet identifier and a sequence number of the first packet, requesting, on a second network, to receive a transport packet identified with the sequence number and comprising the first packet and receiving the first packet embedded in the transport packet, from the second network.

19 Claims, 8 Drawing Sheets

(56) References Cited

U.S. PATENT DOCUMENTS

| | | | |
|---|---|---|---|
| 2005/0166123 A1 | 7/2005 | Yanamoto et al. | |
| 2007/0186142 A1 | 8/2007 | Okazaki et al. | |
| 2007/0300234 A1* | 12/2007 | Dekel et al. | 719/313 |
| 2008/0062998 A1 | 3/2008 | Kim et al. | |
| 2008/0170530 A1 | 7/2008 | Connors et al. | |
| 2010/0005360 A1* | 1/2010 | Begen et al. | 714/751 |
| 2011/0131614 A1* | 6/2011 | Sayadi et al. | 725/62 |

FOREIGN PATENT DOCUMENTS

| | | | | |
|---|---|---|---|---|
| CN | 101232623 | | 7/2008 | |
| CN | 101360232 | | 2/2009 | |
| EP | 0953955 | | 11/1999 | |
| EP | 2019505 | | 1/2009 | |
| EP | 2028801 | | 2/2009 | |
| EP | 2077672 | | 7/2009 | |
| JP | H10117163 | | 5/1998 | |
| JP | H10243372 | | 9/1998 | |
| JP | 2007214656 | | 8/2007 | |
| WO | WO03010969 | | 2/2003 | |
| WO | WO2009036378 | | 3/2009 | |
| WO | WO2009063704 | | 5/2009 | |
| WO | WO 2009/071781 | * | 6/2009 | H04L 1/00 |

OTHER PUBLICATIONS

Koudouridis et al: "On the Performance of Multi-Radio ARQ and Packet Scheduling in Ambient Networks" Vehicular Technicology Conf., 2007, Sep. 1, 2007, pp. 1456-1460.

Search Report Dated Jan. 24, 2011.

Koudouridis et al., "Generic link layer functionality for multi-radio access networks", 14th IST Mobile and Wireless Communication Summit, Dresden Germany, Jun. 19, 2005, pp. 1-5.

Anonymous, "Conexant Delivers Complete Front-End Solution for Terrestrial Set-Top Box Applications", http://www.businesswire.com/news/home/, May 29, 2007, pp. 1-4.

ISO IEC 13818-1: Information Technology, Generic coding of moving pictures and associated audio information: Systems, Second edition, Dec. 1, 2000, pp. 1-174.

ETSI EN 300 744, "Digital Video Broadcasting: Framing structure channel coding and modulation for digital terrestrial television", ETSI EN 300 744 V1.6.1, Jan. 2009, pp. 1-66.

Schulzrinne et al., "RTP: A transport protocol for real-time applications", Network Working Group Request for Comments 3550, Jul. 2003, pp. 1-92.

* cited by examiner

Fig. 8

DIGITAL RECEIVER AND CORRESPONDING DIGITAL TRANSMISSION SYSTEM SERVER

This application claims the benefit, under 35 U.S.C. §365 of International Application PCT/EP2010/065043, filed Oct. 7, 2010, which was published in accordance with PCT Article 21(2) on Apr. 14, 2011 in English and which claims the benefit of European patent application No. 09305963.2, filed Oct. 9, 2009.

FIELD OF THE INVENTION

The present invention relates generally to digital television distribution and in particular to transmission over multiple distribution networks.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Communication systems are generally subject to transmission errors. In broadcast systems, error correction is used to improve transmission robustness. Forward Error Correction (FEC), based on the addition of redundant information, performs error correction without the need of repeating information and without using a return channel. FEC is commonly used on communication networks, such as terrestrial, mobile or satellite networks. Another correction mode uses repetition, where data is sent several times to the receivers. Repetition may be performed on demand from a receiver, where the receiver detects an error and requests repetition to the transmitter. This is possible when a return channel is available. The return channel is used by a receiver to send a request to the transmitter for repeating lost or corrupted information.

In the digital television domain, television decoders, also called set-top boxes, are used to access a set of television channels that are transmitted with encryption and that are decrypted within the decoder. Television decoders are the interface units between the television signal transmission systems, notably digital television signals in MPEG and DVB format, and the display monitors. The transmission means that broadcast the television transmissions to these decoders can be standard aerial transmission means, coaxial cables, optical cables, re-transmission satellites serving a region, or the Internet network. The decoder comprises the reception means to receive the transmitted signals and the formatting means to transform the received signals into signals that can be directly applied to the display device command units. The decoder also usually comprises error detection and error correction means. They are bound to the broadcast transmission means. In particular, in a satellite transmission system, the forward error correction may be used. In a transmission over the Internet Protocol, retransmission may be used.

Set-top boxes are today adapted to receive content from at least two networks, such as the Internet and the terrestrial transmission system. Broadcast video is usually transmitted in the broadcast network, the Internet network being used for interactive services. When receiving video content from the unidirectional terrestrial distribution network, the forward error correction mechanism available on that distribution network is used. However transporting FEC packets may be burdensome and costly for the distribution network. It would be valuable to minimize the impact of the error control over the broadcast network.

SUMMARY OF THE INVENTION

The present invention attempts to remedy at least some of the concerns connected with the prior art, by providing an error correction method using synergy between the networks available at the receiver.

The present invention concerns an error correction method in a digital receiver, comprising the steps of receiving (S1) data information from a broadcast network (109) in a sequence of packets (300), detecting (S2) a first packet within the sequence of packets (300) being a corrupted packet, identifying a packet identifier (418) and a sequence number (416) of the first packet, requesting (S3), on a second network, to receive a transport packet identified with the sequence number (416) and comprising the first packet and receiving (S4) the first packet embedded in the transport packet, from the second network.

Advantageously, the method of the invention enables the receiver to use the second network to perform error control. The first network is then used solely for data distribution. In particular, the invention permits to synchronize the packet transport over both networks, where the synchronization permits the receiver to match the packets sent on the first network to the packets sent on the second network. In particular, the invention permits the receiver to perform correction of a corrupted packet thanks to the second network.

In addition the method of the invention permits to perform real time error correction at the receiver for streaming content.

Another object of the invention is an error correction method at a digital receiver, comprising the steps of receiving (S'1) data information from a broadcast network (109) in a sequence of packets (300), receiving (S'2), from a second network, error correction packets embedded into a transport packet, detecting (S'3) a first packet within the sequence of packets (300), the first packet being a corrupted packet, identifying a packet identifier (418) and a sequence number (416) of the first packet, the sequence number (416) being adapted to enable the receiver to embed a plurality of the packets into a virtual transport packet corresponding to a transport protocol, the virtual transport packet being identified with the sequence number (416) as if the sequence of packets were transmitted using the transport protocol, and recovering (S'4) the virtual transport packet having the sequence number, with an error correction code embedded in a transport packet having the sequence number.

Thus, the invention alternatively permits to obtain the error correction from the second network, synchronized to the first network so that the receiver can easily match the error correction packet to the corrupted packet.

According to an embodiment of the invention, the error correction code is a Forward Error Correction code.

According to an embodiment of the invention, the packets of the sequence of packets are MPEG2-transport stream packets.

According to an embodiment of the invention, the second network is an Internet Protocol type of network.

According to an embodiment of the invention, the transport protocol is RTP and the virtual and transport packets are RTP packets.

Another object of the invention is a receiver device comprising a first network interface adapted to receive first data information from a first network in a sequence of packets, the packets comprising at least one identifier, a second network interface adapted to transmit and receive second data information from a second network, a detector for detecting transmission errors and a corrector for correcting the detected transmission error. The detector is adapted to embed a plurality of the packets into a virtual transport packet corresponding to a transport protocol, the virtual transport packet being identified with the sequence number as if the sequence of packets were transmitted using the transport protocol and, on detection of a corrupted packet within the sequence of packets, requesting, on a second network enabling the transport protocol, to receive a transport packet identified with the sequence number comprised in the corrupted packet.

Another object of the invention is a receiver device comprising a first network interface adapted to receive data information from a first network in a sequence of packets, the packets comprising at least one identifier, a second network interface adapted to receive error correction packets from a second network, a detector for detecting within the sequence of packets, a corrupted packet comprising a sequence number and a corrector for correcting the detected transmission error. The corrector is adapted to embed a plurality of the packets into a virtual transport packet corresponding to a transport protocol, the virtual transport packet being identified with the sequence number as if the sequence of packets were transmitted using the transport protocol and on detection of a corrupted packet within the sequence of packets, and recovering the virtual transport packet having the sequence number, with an error correction code embedded in a transport packet having the sequence number.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

The exemplary embodiments come within the framework of MPEG2 transport stream error control, but the invention is not limited to this particular environment and may be applied within other frameworks where packet transmission is synchronized between two networks.

MPEG2 transport stream, also noted MPEG2-TS, is defined with the ISO IEC 13818-1 standard on "Information Technology, Generic coding of moving pictures and associated audio information: Systems, Second edition 2000-12-01".

Figure 2:
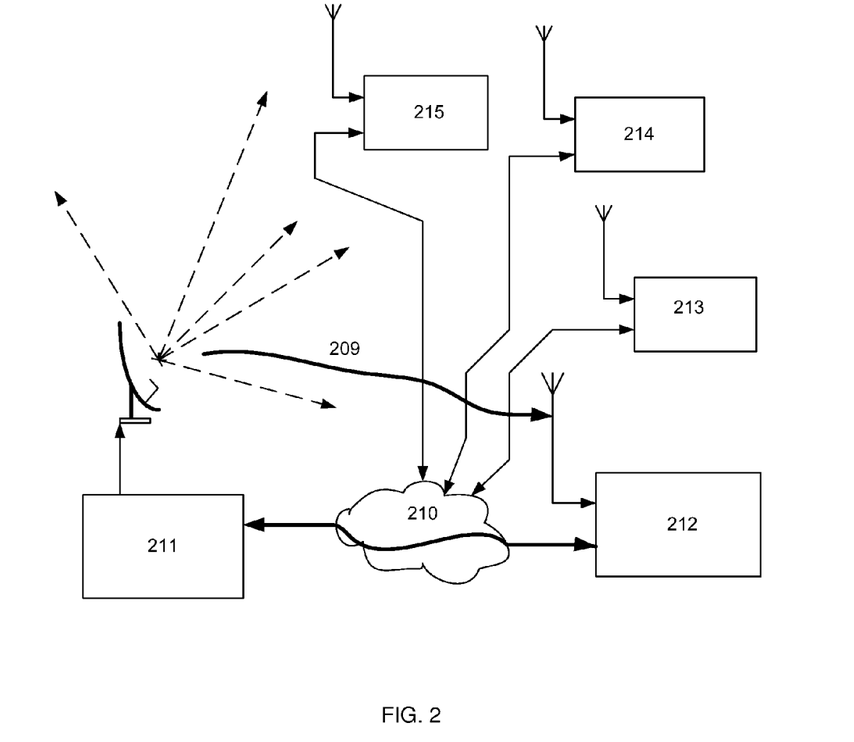
FIG. 2 is a system according to the embodiment of the invention.

FIG. 2 represents the transmission system according to an embodiment of the invention. The system comprises a server 211 adapted to broadcasts MPEG2-TS packets over a unidirectional broadcast network 209 to at least one dual-link digital set-top box 212, 213, 214, 215 connected to the broadcast network 209. The server 211 and the set-top boxes 212, 213, 214, 215 are further connected to a bidirectional network 210. According to the embodiment, the broadcast network is a terrestrial broadcast network compliant with the DVB-T standards family. The bidirectional network is an Internet Protocol type of network, adapted to transport Real-Time Transport Protocol streams, noted RTP streams, and compliant with RFC 3550. In particular the bidirectional network is the Internet network. In variant embodiments, the broadcast network could be any type of broadcast network. Any one of the digital set-top boxes 212, 213, 214, 215 is intended to receive the audio/video program broadcasted from the server 211 through the network 209. Any one of them may receive corrupted information while other set-top boxes on the network 209 receive information without disturbance.

In case one of the set-top boxes 212, 213, 214, 215 detects errors during transmission over the broadcast network 209, it performs error correction as described in the various embodiments herein below.

Figure 3:
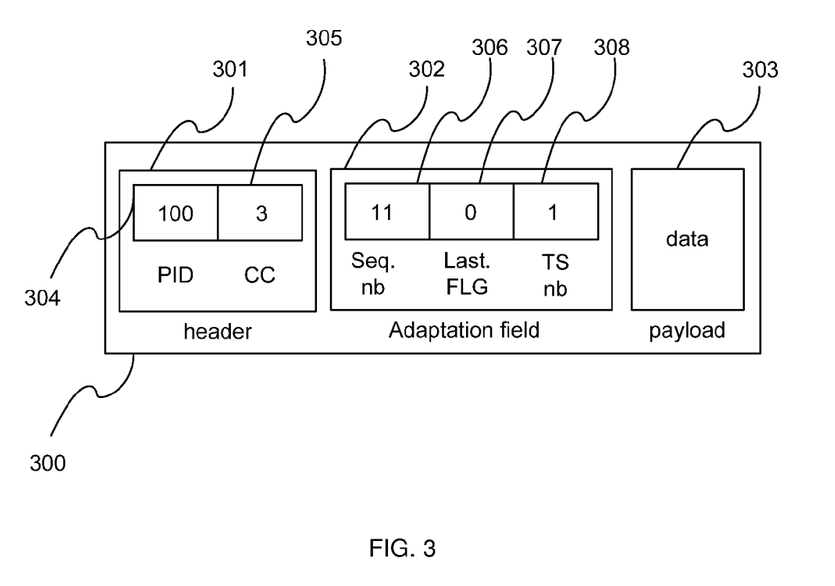
FIG. 3 depicts an audiovisual packet according to the embodiment.

The MPEG2-TS packet 300 is illustrated in FIG. 3. It comprises a header 301, an adaptation field 302 and a payload 303. The packet header 301 comprises information about the packet content: a program identifier (PID) 304 and a continuity counter (CC) 305. The audio/video data carried in the payload 303 of the packet belongs to the audiovisual program identified by said program identifier 304. The continuity counter 305 is incremented for each broadcasted packet corresponding to a given program identifier. The adaptation field 302 generally comprises a private data field. The private data field according to the embodiments comprises a sequence number 306, a last packet flag 307 and a TS number 308. The private data field is used to carry the RTP sequence number of the virtual RTP packet 400, represented in FIGS. 4 and 6, which would be used if the MPEG2 stream were transported over RTP, in particular over the bidirectional network. The sequence number 306 increments by one for each virtual RTP data packet sent, and is used by the receiver to detect packet loss and to restore packet sequence. In order to be able to detect losses of packets at the beginning or end of the virtual RTP packet, an additional byte is used to carry a last_byte flag and a TS packet number inside the virtual RTP packet.

The sequence number then enables the receiver to build the virtual RTP packet carrying these audiovisual streams.

The adaptation field is then bringing an additional 6 bytes (adaptation field length=1 byte+flags=1 byte+private data length=1 byte+seq nb=2 bytes+last_packet_flag & TS_packet_nb=1 byte) to the TS packet, when no other adaptation field is required. It comprises 4 additional bytes (private data length=1 bytes+seq nb=2 bytes+last_packet_flag & TS_packet_nb=1 byte) when an adaptation field is already present in the TS packet.

Figure 4:
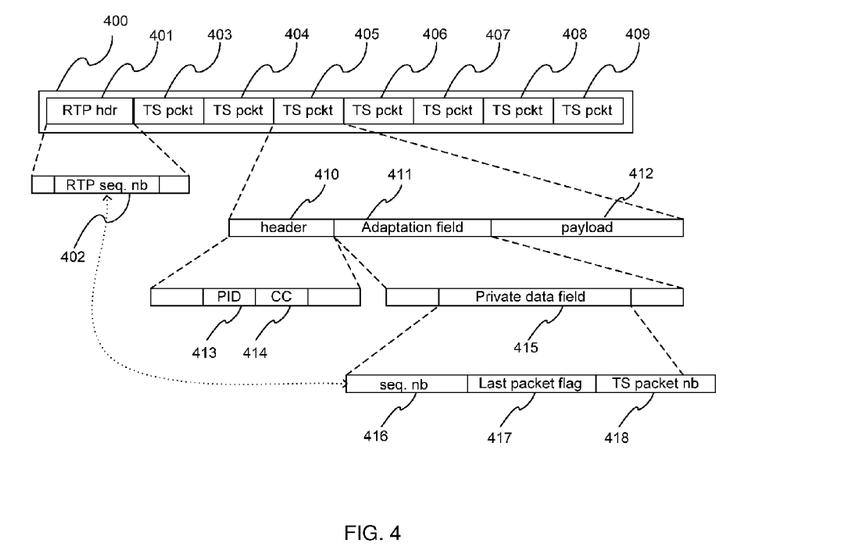
FIG. 4 describes a virtual RTP packet according to the embodiment.

FIG. 4 illustrates a virtual RTP packet 400 embedding the MPEG2-TS packets as illustrated in FIG. 3. The RTP sequence number 402 of the RTP header 401 corresponds to the sequence number 416 of the embedded RTP packets 401-409.

Figure 6:
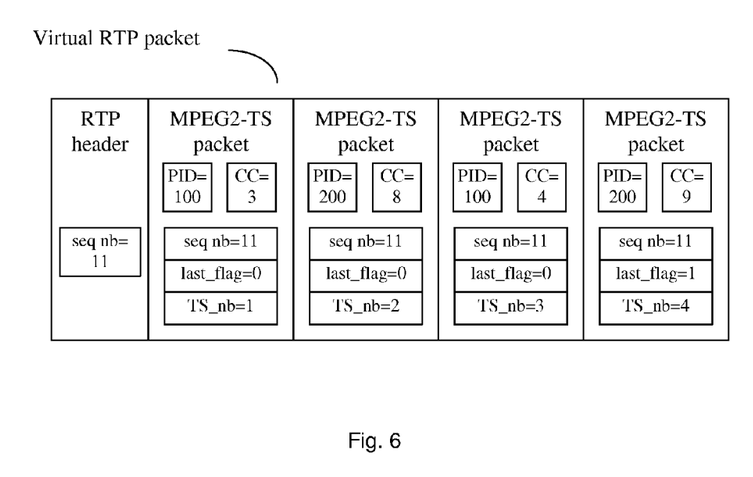
FIG. 6 describes a virtual RTP packet according to the embodiment.

FIG. 6 illustrates a virtual RTP packet comprising four MPEG2-TS packets. The RTP sequence number, indicated in the RTP header, is 11. It is also indicated in each MPEG2-TS adaptation field. The MPEG2-TS packets comprise a PID value of 100 or 200, and are each identified with their continuity counter (CC) value. The TS_nb is incremented from 1 to 4. The last packet last_flag value is set to 1 to indicate that it is the last packet of the RTP packet.

Figure 1:
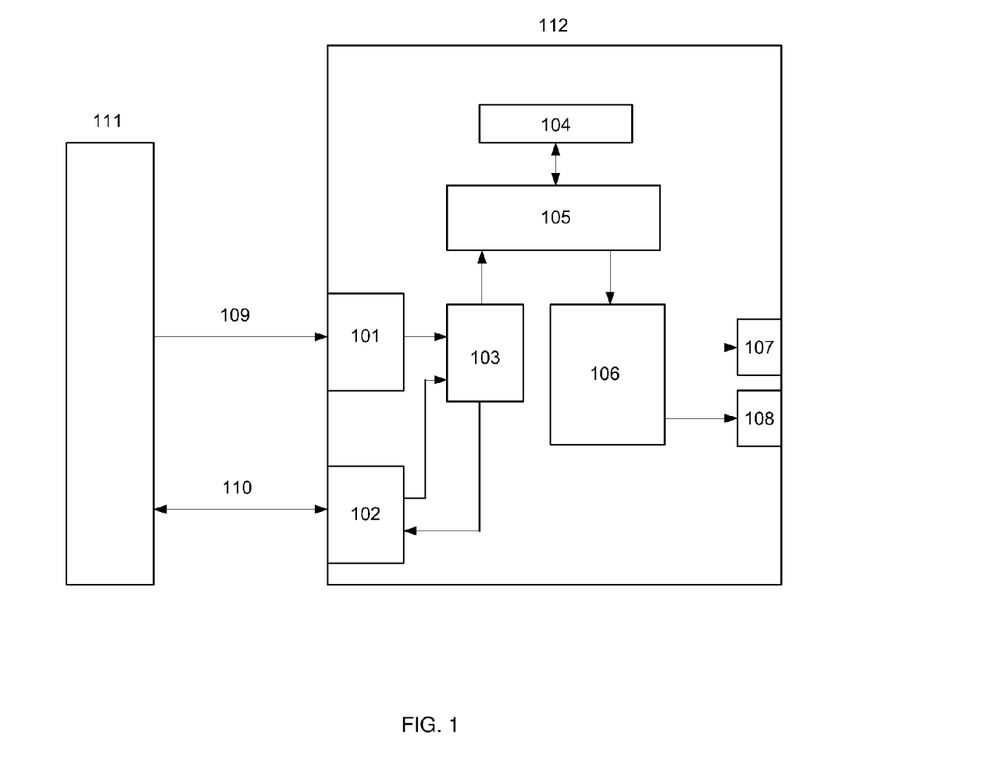
FIG. 1 illustrates a dual-link receiver architecture according to an embodiment of the invention.

FIG. 1 is a bloc diagram of a MPE2-TS receiver 112 according to a first embodiment of the invention. The receiver 112 is connected to the broadcast network 109 through a first network interface 101 and to the bidirectional network 110 through a second network interface 102. Audiovisual information are sent from a server 111 and received in sequence of MPEG2-TS packets by said first network interface 101 and then transmitted to a detector 103. Each MPEG2-TS comprises a header and a payload. Each header comprises a program identifier field and a continuity counter field. The continuity counter value is incremented at the server for each new packet carrying data related to a given program and referenced by the corresponding program identifier. When the continuity counter reaches the max value, it loops to zero. If a packet is missing for a given program, the receiver detects a discontinuity in the value of the continuity counter. The program identifier corresponds to the MPEG2-TS packet identifier (PID).

The packets received are stored in a memory buffer 105 according to a process done at the detector 103, taking into account the program identifier field and the continuity counter field of the packet header. The memory buffer stores the packets according to the program identifier value and the continuity counter value. It stores contiguous packets even if they are received in a wrong order. For example, it can successively store packet 11 for PID A4, packet 13 for PID A4, and packet 12 for PID A4, 11, 12 and 13 being the continuity counter values and A4 the program identifier value.

When the receiver detects a discontinuity in the value of the continuity counter, it means that a packet is missing. The receiver gets the sequence number value of the virtual RTP packet in the adaptation fields of the other packets that have been correctly received. This permits the receiver to identify the sequence number of the virtual RTP packet that embeds the missing packet. The receiver then asks the server to retransmit on the bidirectional network a RTP packet corresponding to the virtual RTP packet.

In particular, the detector 103 detects when the continuity counter field doesn't match the expected value. It then generates a request that is sent to the second network interface 102 and transmitted to the server 111 over the bidirectional network 110. The request comprises the program identifier corresponding to the program carried in the lost packet, the continuity counter value of the lost packet header, the RTP sequence number and information identifying the receiver.

On reception of the request, the server 111 sends the RTP packet over the bidirectional network 110. The second network interface 102 receives the RTP packet and transmits it to the detector 103 which parses the packet header and writes the packet to the memory buffer 105. In parallel of the reception process, an audio and video processing block 106 reads the memory buffer 105 and decodes the audiovisual information to be transmitted to a video output interface 107 and an audio output interface 108. In parallel to the reception process and the decoding processes, the corrector 104 operates a FEC process on the data content of the packet payload, said FEC being based on FEC codes included in the audiovisual information and received by the broadcast network 109. The FEC codes are transmitted at the end of the packet. In particular, in a MPEG2-TS packet, 188 bytes are used for the header and the payload and 16 additional bytes are used to carry FEC codes related to the packet payload.

Figure 7:
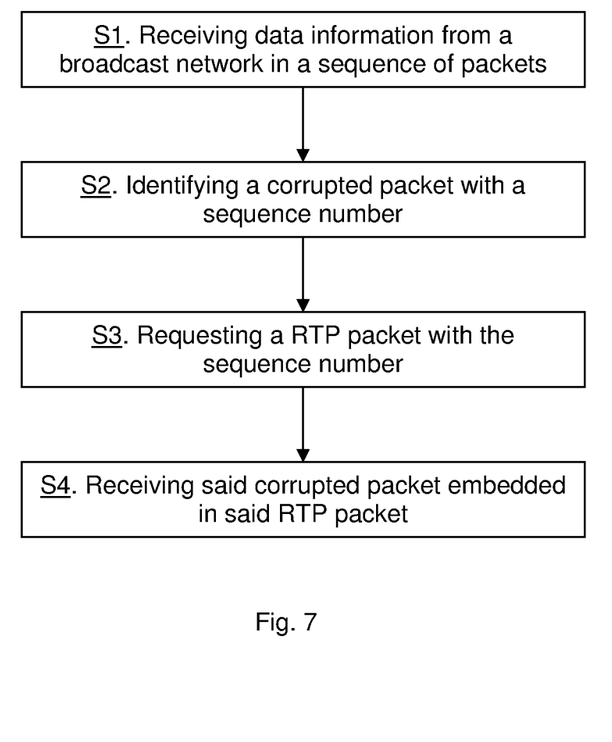
FIG. 7 is a flow chart of a method of an embodiment of the invention.

In summary, as illustrated in FIG. 7, the method of the first embodiment comprises the following steps of:
S1 Receiving data information from a broadcast network in a sequence of packets
S2 Identifying a corrupted packet with a sequence number
S3 Requesting a RTP packet with the sequence number
S4 Receiving said corrupted packet embedded in said RTP packet In the first embodiment, the RTP packet is sent over the bidirectional network. In a variant embodiment, it could be sent over a third network, the bidirectional network being used for the receiver requests only.

According to a second embodiment, the error correction mechanism is performed using a broadcast data flow transmitted over the bidirectional network. In the second embodiment, the adaptation field indicates a reference to identify the position of FEC codes that are simultaneously transmitted over the bidirectional network 110 within a RTP stream. The receiver 112 receives the FEC codes as the payload data of these RTP packets. The RTP packets are received by the second network interface of the receiver 102 and then transmitted to the detector 103. The detector 103 parses the adaptation fields received from the first network interface 101. The adaptation field permits the receiver to build the virtual RTP packet, as performed in the first embodiment. It permits then the receiver to match the RTP packet received on the bidirectional network to the virtual RTP packet received in the first network.

The receiver reads the sequence number and the packet number information related to the location of the FEC codes corresponding to the audiovisual information carried in the payload fields of the packets. The detector 103 also reads the RTP packets headers and identifies the packets where the corresponding FEC codes are transmitted over the bidirectional network and received by the second network interface 102. It writes them to the memory buffer 105 in a location defined according to the adaptation field content. The write operation is adapted to associate the FEC codes received from the bidirectional network 110 to the audiovisual information received from the first network 109 in the memory 105 of the receiver 112. The corrector 104 is then able to process them together to achieve FEC before the audio/video processing means 106 reads the data from the memory buffer 105 for decoding process. Advantageously, the detector 103 is achieved as a hardware coded de-multiplexer block using registers loaded under control of software and comparator blocks linked to a memory interface and associated with a logic block to send a packet request through the second network interface. Alternatively, the detector is achieved under control of a micro-controller block associated with a memory buffer. The micro-controller runs a specific software task to analyze the data from both network interfaces and writes received data within the memory of the receiver and controls registers to send a packet request.

Figure 8:
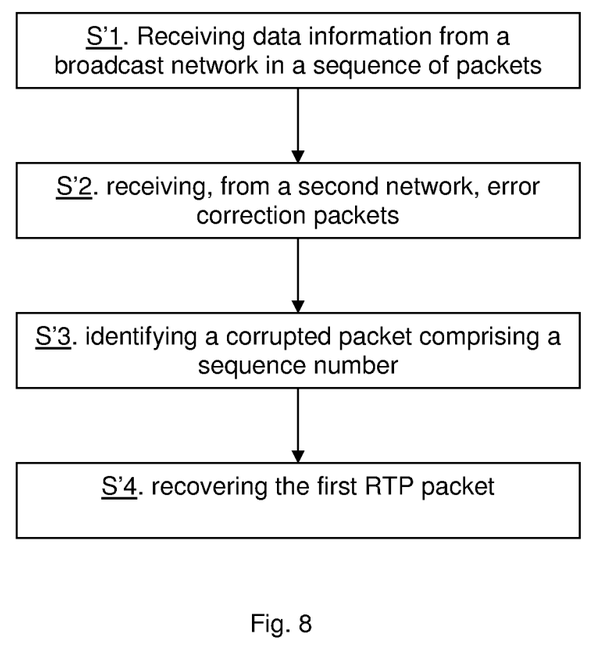
FIG. 8 is a flow chart of a method of another embodiment of the invention.

In summary, as illustrated in FIG. 8, the method of the second embodiment comprises the following steps of:

S'1 Receiving data information from a broadcast network in a sequence of packets S'2 receiving, from a second network, error correction packets S'3 identifying a corrupted packet comprising a sequence number S'4 recovering the first RTP packet.

In the first embodiment, in which an error is detected as soon as a packet is missing and the continuity counter does not match the expected value, the detector processes the continuity counter and the PID. In the second embodiment in which FEC is implemented, the detector is a subsystem of the corrector 104. It detects the error by applying a process such as a FEC algorithm to both audiovisual data from the first broadcast 109 and error correction codes from the bidirectional network 110, both types of data being processed from the receiver memory buffer 105.

In the second embodiment, the program server 211 broadcasts FEC codes related to the audiovisual information data over the bidirectional broadband network 210. The set-top boxes 212, 213, 214, 215 receive the audio/video program broadcasted from the server 211. In case a set-top box detects errors during transmission over the broadcast network 209, it uses the FEC codes received from the bidirectional network 210 associated with the audiovisual information data received from the broadcast first network to process FEC and to have corrected data for further processing.

The first and the second embodiment may be combined to provide the FEC and the retransmission. When the FEC of the second embodiment doesn't permit to correct an error, the receiver uses the retransmission method of the first embodiment to request the retransmission of the RTP packet.

In the embodiments, the RTP is used in the bidirectional network. Of course, any other transport protocols might be used on the second network. More generally, the invention permits synchronizing the packets distribution of the unidirectional network to the transport protocol of the second network.

Figure 5:
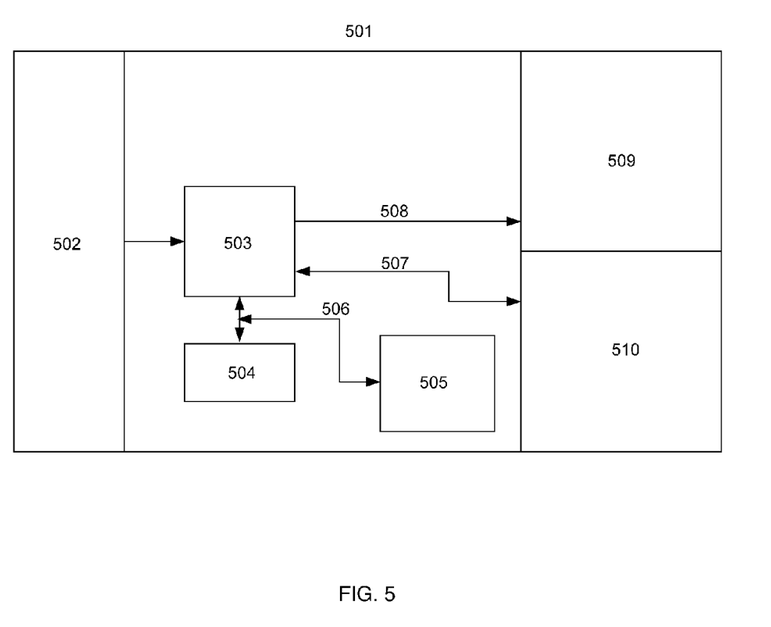
FIG. 5 illustrates a server according to the embodiment of the invention.

FIG. 5 describes the basic architecture of a server 501 according to an embodiment of the invention. The server 501 comprises an input interface 502, an audio/video processing block 503 associated with a memory buffer 504, an output interface 509 adapted to deliver audio and video signals to a broadcast network, an input/output interface 510 adapted to deliver audio and video signals to a broadband network and to receive a request from a connected receiver to repeat a missing or corrupted packet after transmission error on the broadcast network connected to the output interface 509. The input interface receives the audio and video signals from at least one source equipment. The audio and video are processed by a processing block 503 able to generate audio and video in a sequence of packets and to generate FEC codes used to correct transmission errors. The processing block 503 operates with a memory buffer and is able to store a packet for a given time after it has been processed and sent in case it should be send again for error correction. The audio and video packets are sent to the broadcast output interface 509 through a digital bus 508. According to the first embodiment, a packet is resent for error correction to the broadband output interface 510 through the digital bus 507 after a request has been received from the broadband interface 510. According to the second embodiment, the FEC packets are sent to the broadband interface 510.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. An error correction method in a digital receiver comprising a first interface, that receives a first type of packets from a broadcast network, and a second interface to a second network, wherein:
    said second interface receives a second type of packets, each packet of said second type being identified by a sequence number and embedding at least a packet of said first type;
    each packet of said first type comprises:
        a sequence number identifying a packet of said second type; and
        a packet identifier identifying the number of said packet of said first type inside said packet of said second type; and
    said method comprising:
        receiving data information from the broadcast network in packets of said first type,
        detecting a first packet within said packets of said first type as being a corrupted packet,
        identifying a sequence number of a transport packet of said second type to be used to transport said first packet over the second network and a packet identifier of said first packet in said transport packet;
        requesting, on the second network, to receive said transport packet identified with said sequence number and comprising said first packet; and
        receiving said first packet embedded in said transport packet, from said second network.

2. The method according to claim 1, wherein said packets of said first type comprise transport stream-packets according to a second generation of a Moving Picture Experts Group standard.

3. The method according to claim 1, wherein said second network comprises an Internet Protocol type of network.

4. The method according to claim 1, wherein said packets of said second type comprise packets according to Real-time Transport Protocol (RTP) standard.

5. An error correction method at a digital receiver comprising a first interface, that receives a first type of packets from a broadcast network, and a second interface to a second network, wherein:
    said second interface receives a second type of packets, each packet of said second type being identified by a sequence number and embedding at least an error correction code corresponding to an information carried by at least a packet of said first type;
    each packet of said first type comprises:
        a sequence number identifying a packet of said second type; and a packet identifier identifying a position of an error correction code inside said packet of said second type;

said method comprising:
receiving data information from the broadcast network in packets of said first type,
receiving, from the second network, error correction packets embedded into a transport packet of said second type,
detecting a first packet of said first type within said packets of said first type, said first packet being a corrupted packet;
identifying a sequence number of a transport packet to be used to transport an error correction code associated to said first packet over the second network, and a packet identifier of a position of said error correction code inside said transport packet;
recovering the transport packet of said second type having said sequence number; and
correcting said first packet with an error correction code embedded in said transport packet and having a position identified by said packet identifier inside said transport packet.

6. The method according to claim 5, wherein the error correction code comprises a Forward Error Correction code.

7. The method according to claim 5, wherein said packets of said first type comprise transport stream-packets according to a second generation of a Moving Picture Experts Group standard.

8. The method according to claim 5, wherein said second network comprises an Internet Protocol type of network.

9. The method according to claim 5, wherein said packets of said second type comprise packets according to Real-time Transport Protocol (RTP) standard.

10. A receiver device comprising:
a first network interface configured to receive first data information from a first network in packets of a first type,
a second network interface configured to transmit a request for receiving second data information and to receive said second data information from a second network in packets of a second type, each packet of said second type being identified by a sequence number and embedding at least a packet of said first type; each packet of said first type comprising:
a sequence number identifying a packet of said second type; and
a packet identifier identifying the number of said packet of said first type inside said packet of said second type;
a detector for detecting a corrupted packet of said first type in said packets, said corrupted packet being identified with a sequence number of a transport packet of said second type to be used to transport said corrupted packet over the second network and a packet identifier of said corrupted packet in said transport packet, and
a corrector for correcting said corrupted packet by requesting, on the second network, to receive said transport packet identified with said sequence number and comprising said corrupted packet.

11. The method according to claim 10, wherein said packets of said first type comprise transport stream-packets according to a second generation of a Moving Picture Experts Group standard.

12. The method according to claim 10, wherein said second network comprises an Internet Protocol type of network.

13. The method according to claim 10, wherein said packets of said second type comprise packets according to Real-time Transport Protocol (RTP) standard.

14. The method according to claim 10, wherein the error correction code comprises a Forward Error Correction code.

15. A receiver device comprising:
a first network interface configured to receive data information from a first network in packets of a first type,
a second network interface configured to receive error correction packets embedded into at least a transport packet of a second type from a second network, each packet of said second type being identified by a sequence number and embedding at least an error correction code corresponding to an information carried by at least a packet of said first type; each packet of said first type comprising:
a sequence number identifying a packet of said second type; and a packet identifier identifying a position of an error correction code inside said packet of said second type;
a detector for detecting a corrupted packet of said first type within said packets of said first type, said corrupted packet being identified with a sequence number of a transport packet of said second type to be used to transport an error correction code associated to said corrupted packet over the second network, and a packet identifier of a position of said error correction code inside said transport packet, and
a corrector for correcting said detected corrupted packet by recovering the transport packet having said sequence number, with an error correction code embedded in said transport packet and having a position identified by said packet identifier inside said transport packet.

16. The apparatus according to claim 15, wherein the packets of said first type comprise transport stream-packets according to a second generation of a Moving Picture Experts Group standard.

17. The apparatus according to claim 15, wherein said second network comprises an Internet Protocol type of network.

18. The apparatus according to claim 15, wherein said packets of said second type comprise packets according to Real-time Transport Protocol (RTP) standard.

19. The apparatus according to claim 15, wherein the error correction code comprises a Forward Error Correction code.

* * * * *